US011215376B2

(12) United States Patent
Xu et al.

(10) Patent No.: US 11,215,376 B2
(45) Date of Patent: Jan. 4, 2022

(54) INTEGRATED ENVIRONMENTAL CONTROL FOR SHARED LOCATIONS

(71) Applicant: Carrier Corporation, Palm Beach Gardens, FL (US)

(72) Inventors: Ke Xu, Germantown, MD (US); Dang Nguyen, Alpharetta, GA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 25 days.

(21) Appl. No.: 16/631,579

(22) PCT Filed: Jul. 19, 2018

(86) PCT No.: PCT/US2018/042868
§ 371 (c)(1),
(2) Date: Jan. 16, 2020

(87) PCT Pub. No.: WO2019/018627
PCT Pub. Date: Jan. 24, 2019

(65) Prior Publication Data
US 2020/0200422 A1 Jun. 25, 2020

Related U.S. Application Data

(60) Provisional application No. 62/535,422, filed on Jul. 21, 2017.

(51) Int. Cl.
*F24F 11/62* (2018.01)
*F24F 11/30* (2018.01)
*G06Q 10/10* (2012.01)

(52) U.S. Cl.
CPC .............. *F24F 11/62* (2018.01); *F24F 11/30* (2018.01); *G06Q 10/1095* (2013.01)

(58) Field of Classification Search
CPC .. F24F 11/62; F24F 11/30; F24F 11/64; F24F 2120/10; G06Q 10/1095; G05B 15/02
See application file for complete search history.

(56) References Cited

U.S. PATENT DOCUMENTS

| | | | |
|---|---|---|---|
| 5,924,486 A | * | 7/1999 | Ehlers ...................... F24F 11/30 165/238 |
| 6,145,751 A | | 11/2000 | Osman |

(Continued)

FOREIGN PATENT DOCUMENTS

| | | |
|---|---|---|
| CN | 101553697 A | 10/2009 |
| CN | 104121663 A | 10/2014 |

(Continued)

OTHER PUBLICATIONS

A. Barbato, et al., Home Energy Saving through a User Profiling System based on Wireless Sensors, BuildSys'09, Nov. 3, 2009, 6 pages.

(Continued)

*Primary Examiner* — Ramesh B Patel
(74) *Attorney, Agent, or Firm* — Cantor Colburn LLP

(57) ABSTRACT

A method of integrated environmental control for shared locations includes determining, by a processor of an indoor environment planning system, an occupancy schedule for users scheduled to be at a shared location. The processor of the indoor environment planning system determines a plurality of occupant indoor environmental setting preferences for the users scheduled to be at the shared location based on the occupancy schedule and a weighted set point for a building system operable to adjust an indoor environment at the shared location based on the occupant indoor environmental setting preferences for the users scheduled to be at the shared location. The processor of the indoor environment planning system determines an adjusted set point schedule for the shared location to transition between a previously (Continued)

planned set point and the weighted set point. A control device of the building system is operated based on the adjusted set point schedule.

18 Claims, 6 Drawing Sheets

(56) References Cited

U.S. PATENT DOCUMENTS

| | | | |
|---|---|---|---|
| 6,216,956 B1* | 4/2001 | Ehlers | F24F 11/30 |
| | | | 236/47 |
| 6,754,504 B1 | 6/2004 | Reed | |
| 6,990,335 B1* | 1/2006 | Shamoon | H04M 1/72415 |
| | | | 455/419 |
| 7,436,292 B2 | 10/2008 | Rourke et al. | |
| 7,565,225 B2 | 7/2009 | Dushane et al. | |
| 7,904,209 B2 | 3/2011 | Podgorny et al. | |
| 8,180,492 B2 | 5/2012 | Steinberg | |
| 8,239,922 B2 | 8/2012 | Sullivan et al. | |
| 8,510,255 B2 | 8/2013 | Fadell et al. | |
| 8,538,456 B2 | 9/2013 | Moton, Jr. et al. | |
| 8,630,741 B1 | 1/2014 | Matsuoka et al. | |
| 8,694,165 B2 | 4/2014 | Smith et al. | |
| 8,950,686 B2 | 2/2015 | Matsuoka | |
| 9,020,647 B2 | 4/2015 | Johnson | |
| 9,298,197 B2 | 3/2016 | Matsuoka et al. | |
| 9,423,779 B2 | 8/2016 | Agarwal | |
| 9,477,239 B2 | 10/2016 | Bergman et al. | |
| 9,500,377 B2 | 11/2016 | Viswanathan | |
| 9,535,411 B2 | 1/2017 | Wei et al. | |
| 10,505,751 B2 | 12/2019 | Casilli | |
| 2003/0103075 A1 | 6/2003 | Rosselot | |
| 2005/0097905 A1* | 5/2005 | Kwon | F24F 11/30 |
| | | | 62/157 |
| 2008/0281472 A1 | 11/2008 | Podgorny et al. | |
| 2010/0070101 A1 | 3/2010 | Benes et al. | |
| 2010/0262298 A1 | 10/2010 | Johnson et al. | |
| 2010/0318226 A1 | 12/2010 | Augusto et al. | |
| 2011/0082594 A1 | 4/2011 | Dage et al. | |
| 2011/0190953 A1 | 8/2011 | Park et al. | |
| 2011/0238222 A1* | 9/2011 | Nikovski | F24F 11/30 |
| | | | 700/276 |
| 2012/0023225 A1 | 1/2012 | Imes et al. | |
| 2013/0231792 A1 | 9/2013 | Ji et al. | |
| 2013/0274940 A1* | 10/2013 | Wei | G06Q 50/06 |
| | | | 700/291 |
| 2013/0310987 A1 | 11/2013 | Sobek et al. | |
| 2014/0222210 A1* | 8/2014 | Agarwal | G05B 15/02 |
| | | | 700/275 |
| 2014/0277765 A1* | 9/2014 | Karimi | G05B 15/02 |
| | | | 700/276 |
| 2014/0316581 A1 | 10/2014 | Fadell et al. | |
| 2014/0316582 A1 | 10/2014 | Berg-Sonne et al. | |
| 2014/0365017 A1 | 12/2014 | Hanna et al. | |
| 2015/0088272 A1 | 3/2015 | Drew | |
| 2015/0088786 A1 | 3/2015 | Anandhakrishnan | |
| 2015/0160673 A1 | 6/2015 | Vasylyev | |
| 2015/0168002 A1 | 6/2015 | Plitkins et al. | |
| 2015/0247646 A1 | 9/2015 | Song et al. | |
| 2015/0330645 A1 | 11/2015 | Speranzon et al. | |
| 2015/0338117 A1 | 11/2015 | Henneberger et al. | |
| 2016/0054023 A1 | 2/2016 | Baker et al. | |
| 2016/0069585 A1 | 3/2016 | Shrubsole et al. | |
| 2016/0085248 A1 | 3/2016 | Gordon et al. | |
| 2016/0123617 A1 | 5/2016 | Vega | |
| 2016/0131383 A1* | 5/2016 | Zhao | F24F 11/62 |
| | | | 700/276 |
| 2016/0139582 A1 | 5/2016 | Matsuoka et al. | |
| 2016/0201934 A1* | 7/2016 | Hester | F24F 11/62 |
| | | | 700/276 |
| 2017/0030603 A1* | 2/2017 | Barooah | G05B 19/406 |
| 2017/0038753 A1 | 2/2017 | Shah et al. | |
| 2017/0074534 A1 | 3/2017 | Turner | |
| 2017/0075510 A1 | 3/2017 | Bentz et al. | |
| 2017/0123440 A1* | 5/2017 | Mangsuli | F24F 11/62 |
| 2017/0191695 A1 | 7/2017 | Bruhn et al. | |
| 2017/0205105 A1 | 7/2017 | Adam et al. | |
| 2017/0211837 A1 | 7/2017 | Gupta et al. | |
| 2020/0182499 A1 | 6/2020 | Xu et al. | |
| 2020/0201271 A1 | 6/2020 | Xu et al. | |

FOREIGN PATENT DOCUMENTS

| | | |
|---|---|---|
| CN | 105160519 A | 12/2015 |
| CN | 205229864 U | 5/2016 |
| CN | 205351662 U | 6/2016 |
| CN | 106094942 A | 11/2016 |
| CN | 205692073 U | 11/2016 |
| CN | 106534088 A | 3/2017 |
| JP | 2010133665 A | 6/2010 |
| JP | 2017089967 A | 5/2017 |
| WO | 2005024311 A1 | 3/2005 |
| WO | 2014051632 A1 | 4/2014 |
| WO | 2014084832 A2 | 6/2014 |
| WO | 2014182621 A1 | 11/2014 |
| WO | 2016025802 A1 | 2/2016 |
| WO | 2017078941 A1 | 5/2017 |
| WO | 2017120262 A1 | 7/2017 |

OTHER PUBLICATIONS

A. Hang-yat Lam, et al., An Occupant-participatory Approach for Thermal Comfort Enhancement and Energy Conservation in Buildings, e-Energy'14, Jun. 11-13, 2014, 11 pages.
Alarm.com: Geolocation + Sensors + Learning = Really Smart Thermostat, retrieved from the internet: http://www.alarm.com/about/media/MediaGeneric.aspx?cmid=179, May 31, 2017, 2 pages.
International Application No. PCT/US2018/042863 International Search Report and Written Opinion dated Oct. 16, 2018, 18 pages.
International Application No. PCT/US2018/042868 International Search Report and Written Opinion dated Oct. 4, 2018, 13 pages.
International Application No. PCT/US2018/042888 International Search Report and Written Opinion dated Oct. 17, 2018, 13 pages.
L. Klein, et al. Coordinating occupant behavior for building energy and comfort management using multi-agent systems, Published in Automation in Construction, Mar. 2012, vol. 22, pp. 525-536.
T. Nguyen, et al., Energy intelligent buildings based on user activity: A survey, Energy and Buildings 56 (2013) pp. 244-257.
CN Application No. 201880048945.7 Second Office Action dated Jun. 16, 2021, with English Translation, 27 pages.
CN Application No. 201880049005 First Office Action dated Mar. 3, 2021, 16 pages.
EP Application No. 18755994.3 Office Action dated Oct. 6, 2021, 9 pages.

* cited by examiner

INTEGRATED ENVIRONMENTAL CONTROL FOR SHARED LOCATIONS

BACKGROUND

The subject matter disclosed herein generally relates to the field of building systems, and more particularly to integrated environmental control of building systems for shared locations.

Building occupants can have specific preferences for indoor environmental conditions, such as temperature, humidity, noise level, indoor air pollutant level, for example, $CO_2$, or illuminance level. Set points for shared indoor spaces, such as within commercial buildings, are typically regulated according to a pre-determined schedule. The pre-determined schedule is typically set up by a facility manager, and the occupants of the indoor environment may not be provided with control access to adjust the set points. In some systems, indoor environmental conditions, such as temperature, may change based on a time of day regardless of whether the location is occupied or unoccupied.

BRIEF SUMMARY

According to one embodiment, a method of integrated environmental control for shared locations is provided. The method includes determining, by a processor of an indoor environment planning system, an occupancy schedule for a plurality of users scheduled to be at a shared location. The processor of the indoor environment planning system determines a plurality of occupant indoor environmental setting preferences for the users scheduled to be at the shared location based on the occupancy schedule and a weighted set point for a building system operable to adjust an indoor environment at the shared location based on the occupant indoor environmental setting preferences for the users scheduled to be at the shared location. The processor of the indoor environment planning system determines an adjusted set point schedule for the shared location to transition between a previously planned set point and the weighted set point. A control device of the building system is operated based on the adjusted set point schedule.

In addition to one or more of the features described above, or as an alternative, further embodiments may include where the weighted set point is determined based on a complaint history of the users and applies a greater weight for the users having a larger number of complaints.

In addition to one or more of the features described above, or as an alternative, further embodiments may include where the weighted set point is determined based on one or more energy efficiency constraints to balance the occupant indoor environmental setting preferences of the users with anticipated energy usage.

In addition to one or more of the features described above, or as an alternative, further embodiments may include identifying a plurality of scheduled meetings at the shared location, and setting the adjusted set point schedule based on differences in the weighted set point for each of the scheduled meetings.

In addition to one or more of the features described above, or as an alternative, further embodiments may include where one or more intermediate set points are inserted in a transition region between the scheduled meetings in the adjusted set point schedule.

In addition to one or more of the features described above, or as an alternative, further embodiments may include transitioning the adjusted set point schedule to a default occupied setting between the scheduled meetings.

In addition to one or more of the features described above, or as an alternative, further embodiments may include transitioning the adjusted set point schedule to a default unoccupied setting before the scheduled meetings and after the scheduled meetings, where the default unoccupied setting is different than the default occupied setting.

In addition to one or more of the features described above, or as an alternative, further embodiments may include monitoring occupancy at the shared location, and modifying the adjusted set point schedule based on detecting a difference between the occupancy schedule and the occupancy at the shared location.

In addition to one or more of the features described above, or as an alternative, further embodiments may include mapping a plurality of names of the users to a plurality of user devices, and monitoring one or more locations of the user devices relative to the shared location.

In addition to one or more of the features described above, or as an alternative, further embodiments may include periodically re-evaluating the occupancy schedule and the occupant indoor environmental setting preferences of the users to update the adjusted set point schedule.

According to an embodiment, a system for integrated environmental control for shared locations includes a processor and a memory including computer-executable instructions that, when executed by the processor, cause the processor to perform operations. The operations includes determining an occupancy schedule for a plurality of users scheduled to be at a shared location, and determining a plurality of occupant indoor environmental setting preferences for the users scheduled to be at the shared location based on the occupancy schedule. The operations further include determining a weighted set point for a building system operable to adjust an indoor environment at the shared location based on the occupant indoor environmental setting preferences for the users scheduled to be at the shared location, and determining an adjusted set point schedule for the shared location to transition between a previously planned set point and the weighted set point. A control device of the building system is operated based on the adjusted set point schedule.

Technical effects of embodiments of the present disclosure include predictively adjusting building systems based upon the preferences of users expected to occupy the location and the preferences of users presently occupying the location.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
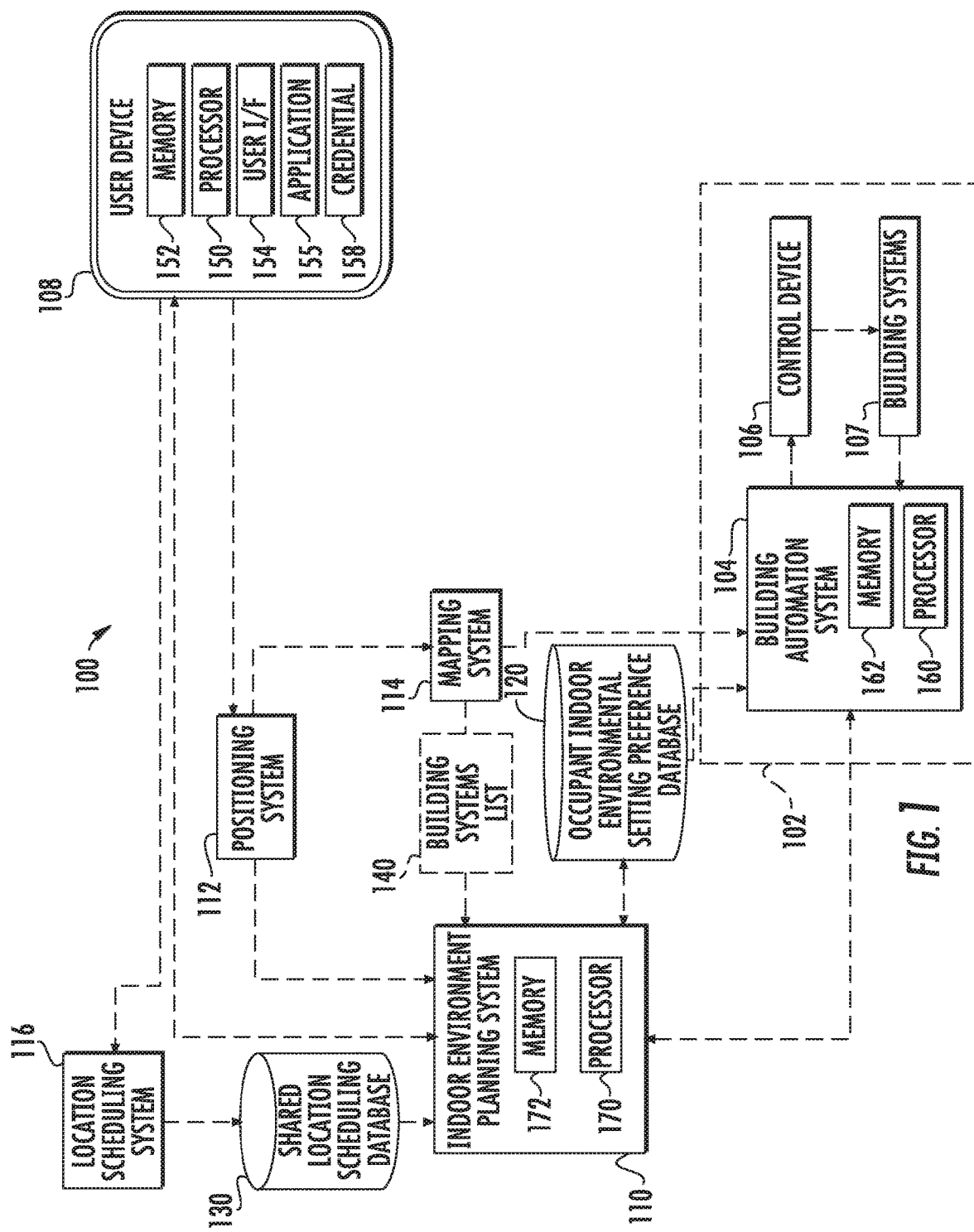
FIG. 1 illustrates a schematic view of a building control system, in accordance with an embodiment of the disclosure.

FIG. 1 depicts a building control system 100 in an example embodiment. The building control system 100 may be located partially or entirely within a building 102, and includes a building automation system 104 operable to command at least one control device 106 with at least one control setting for one or more building systems 107. The building control system 100 can also include an indoor environment planning system 110 operable to interface with at least one user device 108, a positioning system 112, a mapping system 114, and the building automation system 104 through one or more communication channels. Communication within the building control system 100 can be performed using any known medium and protocol, such as one or more optical, wired, and/or wireless communication channels. In some embodiments, the indoor environment planning system 110 provides a secure interface between the user device 108 and the building automation system 104. In alternate embodiments, user device 108 directly interfaces with the building automation system 104. Although depicted separately, the building automation system 104, user device 108, indoor environment planning system 110, positioning system 112, and/or mapping system 114 can be combined in various combinations/sub-combinations or be further distributed between additional systems (not depicted). In some embodiments, the building 102 may be a building or a collection of buildings that may or may not be physically located near each other. The building 102 may include any number of floors.

A location scheduling system 116 can be accessed by the user device 108 to manage resource scheduling and shared calendar functions in a shared location scheduling database 130. For example, the shared location scheduling database 130 can identify which users of user devices 108 are scheduled to be at a particular shared location, such a conference room, within the building 102 for a block of time. For instance, meeting invitations sent to users through the location scheduling system 116 or another device/system can be used to establish an occupancy schedule in the shared location scheduling database 130 for the users at one or more shared locations in the building 102. The term "shared location" refers to any location in the building 102 capable of being identified with a physical capacity to be occupied by more than one person at the same time, such as a conference room, a large office, an exercise room, a dining room, and the like. In some embodiments, a shared location has one or more separately controllable zones. In some embodiments, there can be an overlap of at least one controllable zone that include multiple locations, such as a conference room and one or more offices in a same heating/cooling control zone. Controllable zones can have different sizes, such as such as multiple lighting zones within a single temperature control zone. The shared location scheduling database 130 can also be accessed by multiple systems within the building control system 100, such as the indoor environment planning system 110 and/or the building automation system 104.

In embodiments, the user device 108 may be a computing device such as a desktop computer. The user device 108 may also be a mobile computing device that is typically carried by a person, such as, for example a phone, personal digital assistance (PDA), smart watch, tablet, laptop, etc. The user device 108 may also be two separate devices that are synced together such as, for example, a cellular phone and a desktop computer synced over an internet connection. The user device 108 may include a processor 150, memory 152, and a user interface 154 as shown in FIG. 1. The processor 150 can be any type or combination of computer processors, such as a microprocessor, microcontroller, digital signal processor, application specific integrated circuit, programmable logic device, and/or field programmable gate array. The memory 152 is an example of a non-transitory computer readable storage medium tangibly embodied in the user device 108 including executable instructions stored therein, for instance, as firmware. The user device 108 is configured to store a unique credential 158 that may be shared with various components of the building control system 100 to establish a user identifier associated with a user of the user device 108. In a non-limiting example, the user device 108 may belong to an employee and/or resident of the building 102. The user device 108 may also include an application 155. Embodiments disclosed herein may operate through the application 155 installed on the user device 108.

Similar to the user device 108, the building automation system 104 includes a processor 160 and memory 162, and the indoor environment planning system 110 includes a processor 170 and memory 172. Although not depicted in FIG. 1, it will be understood that other components of the building control system 100 can also include a processor and memory as described herein, such as within control device 106, positioning system 112, mapping system 114, location scheduling system 116, and the like. The processor (e.g., processor 160, 170) can be any type or combination of computer processors, such as a microprocessor, microcontroller, digital signal processor, application specific integrated circuit, programmable logic device, and/or field programmable gate array. The memory (e.g., memory 162, 172) is an example of a non-transitory computer readable storage medium tangibly embodied in or operably connected to the path determination system including executable instructions stored therein, for instance, as firmware. Various communication protocols can be implemented to establish one-way and/or two-way communication within the building control system 100 using, for instance, wired and/or wireless links.

The positioning system 112 is configured to determine a location (i.e., current position) of the user of the user device 108. The location can include (x, y, z) coordinates of the user device 108 on a map. The (x, y, z) coordinates may translate to a latitude, a longitude, and an elevation. The positioning system 112 may use various methods in order to determine the location of the user, such as, for example, GPS, Bluetooth triangulation, WiFi triangulation, cellular signal triangulation, or any other location determination method known to one of skill in the art. The positioning system 112 is further configured to transmit the current position to the user device 108 (i.e., location of the user) and to at least one of the indoor environment planning system 110 and the mapping system 114. The indoor environment planning system 110 and the mapping system 114 are configured to receive the location of the user device 108 from the positioning system 112. As an alternative or in addition to the positioning system 112, a badge-based access and entry system can be used to determine occupant location.

The mapping system 114 is further configured to store the (x, y, z) coordinates of control devices 106, building systems 107, and/or various features of the building 102. When the mapping system 114 is provided with the current location of a user device 108, the mapping system 114 is configured determine a building systems list 140 in response to the current location of the user device 108. The building systems list 140 can identify which building systems 107 that the user may have access to depending upon the location of the user. For example, if the user enters conference room A with user device 108, the location of the user device 108 can be determined as conference room A, and the mapping system 114 can determine all the building systems 107 available to the user in conference room A in a building systems list 140. The building systems list 140 may then be displayed upon the user interface 154 of the user device 108 through application 155, and the user may select a building system 107 to control or provide feedback about on the building systems list 140 through the application 155.

The building systems 107 may include one or more individual controlled building settings including but not limited to lights, air temperature, air quality (CO2 level), humidity, noise level, blinds, etc. The building systems 107 are controlled by a corresponding instance of control device 106 based on control settings from building automation system 104, which can also be set/overridden by feedback from the user device 108. In one example, the feedback may be a change request from a user based on a user-initiated action to dim the lights, and thus the building system 107 may dim the lights in the location of the user. Adjustments to control devices 106 may include but is not limited to turning lights on/off, adjusting the strength of lights, adjusting the color of lights, increasing/decreasing the temperatures, opening/closing the blinds, increasing/reducing humidity levels, increasing/reducing fresh air intake levels, increasing/reducing noise levels (e.g., white noise generator or active noise cancellation), etc. The combination of multiple settings of the building systems 107 at a same location can be referred to as the scene.

In embodiments, a system such as the indoor environment planning system 110 or another system learns user preferences for a plurality of users through user devices 108 and stores indoor environmental user preferences in an occupant indoor environmental setting preference database 120. The contents of the occupant indoor environmental setting preference database 120 may be accessible by the building automation system 104 to make automated adjustments to the control devices 106 based on data from mapping system 114 and/or positioning system 112 that identifies current location information for a plurality of users in the building 102. The building automation system 104 and/or the indoor environment planning system 110 can also determine one or more relationships between an event history and location data of the users based on the occupant indoor environmental setting preferences in the occupant indoor environmental setting preference database 120. Relationships can include various groupings of user with similar preferences, locations identified as having higher levels of feedback, time-of-day/time-of-year trends, occupancy patterns with respect to indoor environmental settings, and the like. The relationships can be summarized and output for further direct and/or indirect use, such as predictive adjustments by the building automation system 104, maintenance/service requests for the building systems 107, and/or other actions. In embodiments, the indoor environment planning system 110 determines a weighted set point for at least one building system 107 operable to adjust an indoor environment at a location based on the occupant indoor environmental setting preferences extracted from the occupant indoor environmental setting preference database 120 and an occupancy schedule from the shared location scheduling database 130 for users as weighted with respect to the complaint history of the users, and/or other factors such as a predicted and/or actual staying time (e.g., a block of time at a same location) of each user at the location. The weighted set point can also be adjusted for one or more energy efficiency constraints to balance user preferences with anticipated energy usage. The building automation system 104 can use the weighted set point to adjust at least one control device 106 of at least one corresponding building system 107. In embodiments, the indoor environment planning system 110 determines an adjusted set point schedule for a shared location to transition between a previously planned set point and the weighted set point. The adjusted set point schedule is provided to the building automation system 104 to adjust one or more control device 106 of one or more building system 107 to transition between each previously planned set point and a corresponding weighted set point. For example, if a previously planned set point is 82 degrees F., and a weighted set point is 70 degrees F. at a future time T1, then cooling may need to be scheduled to start earlier before future time T1 than if the previously planned set point is 72 degrees F.

Figure 2:
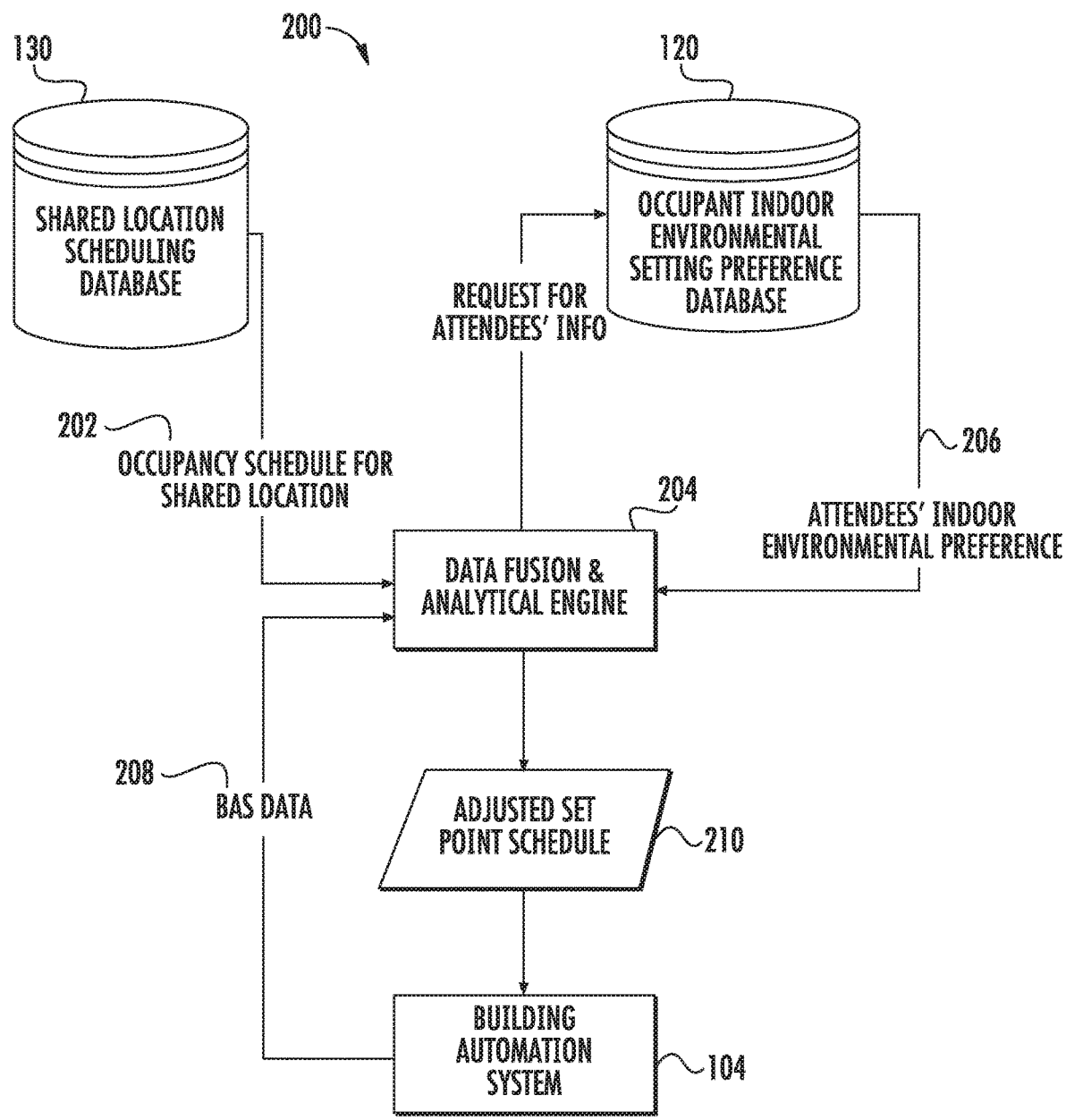
FIG. 2 depicts a block diagram of indoor environmental planning, according to an embodiment of the present disclosure.

Referring now to FIG. 2, while referencing components of FIG. 1, FIG. 2 depicts a block diagram of indoor environmental planning 200 according to an embodiment. The indoor environmental planning 200 can be performed by the indoor environment planning system 110. An occupancy schedule 202 for a shared location can be provided from the shared location scheduling database 130 to a data fusion and analytics engine 204 to trigger a request for user information from the occupant indoor environmental setting preference database 120. A plurality of occupant indoor environmental setting preferences 206 for the users can be provide from the occupant indoor environmental setting preference database 120 to the data fusion and analytics engine 204 responsive to the request. The data fusion and analytics engine 204 can also receive data 208 from the building automation system 104 associated with the shared location, such as sensor data indicating presently detected state values at the shared location and/or previously planned set points at the shared location. The data fusion and analytics engine 204 can determine one or more weighted set points based on the occupancy schedule 202 (e.g., planned arrival and staying time) and balancing the occupant indoor environmental setting preferences 206 with energy efficiency constraints of the building automation system 104, and/or other values of data 208 from the building automation system 104 (e.g., current state and/or previously planned set points at the shared location). The weighting can adjust for probability of users being present at the shared location, for instance, by giving a higher weighting to users that have confirmed a meeting invitation with a planned attendance indicator and giving a lower weighting to users who have a tentative indicator set for the meeting, and optionally, a lower weighting for users who were invited but did not provide any attendance confirmation in the shared location scheduling database 130. Weighting can also be increased for users based on a history of a greater number of complaints associated with environmental conditions as tracked in the occupant indoor environmental setting preference database 120. The data fusion and analytics engine 204 determines an adjusted set point schedule 210 for the shared location to transition between a previously planned set point and the weighted set point for one or more of the building systems 107 of FIG. 1. Energy efficiency constraints can be used to increase weighting of user preferences that consume less energy at higher demand times and/or decreasing weighting of user preferences that consume more energy at higher demand times. The adjusted set point schedule 210 is provided to the building automation system 104 to adjust a control device 106 of the building system 107 to transition between the previously planned set point and the weighted set point for one or more controllable parameters at the shared location.

Figure 3:
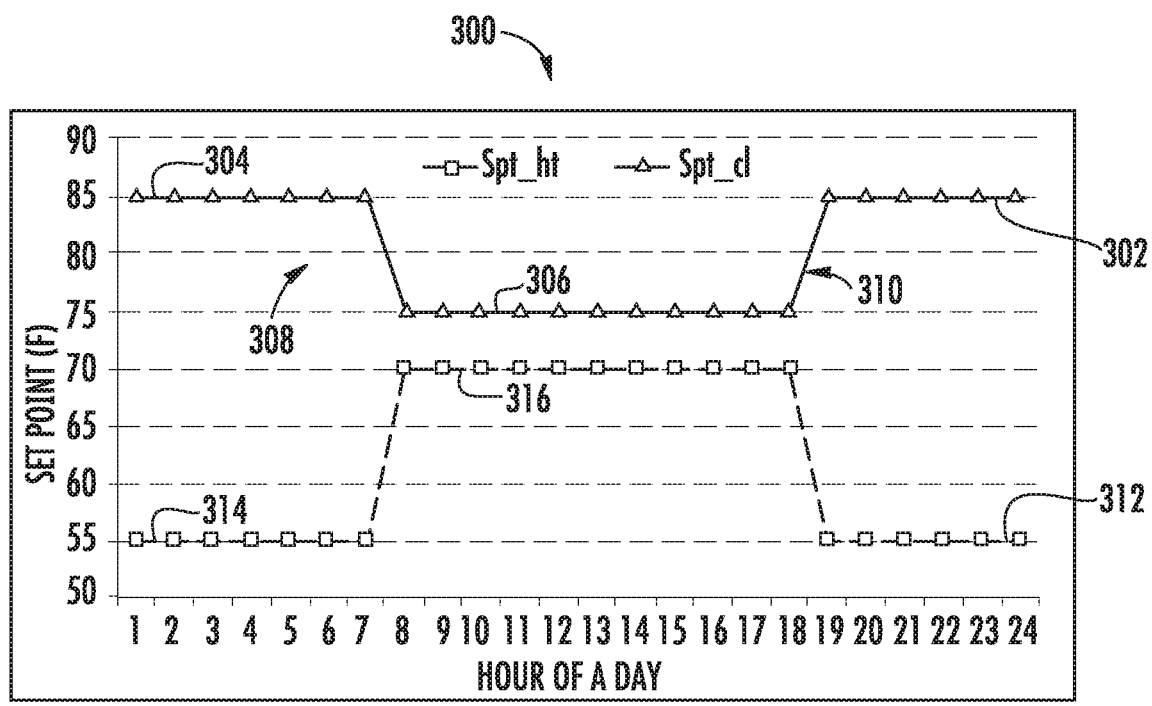
FIG. 3 depicts an example of a default set point schedule for indoor environmental planning, according to an embodiment of the present disclosure.

FIG. 3 depicts an example of a default set point schedule 300 for indoor environmental planning. The default set point schedule 300 is depicted for temperature settings in the example of FIG. 3; however, it will be understood that multiple environmental settings at a shared location can have similar but separate schedules. In FIG. 3, a cooling schedule 302 transitions from a default unoccupied setting 304 to a default occupied setting 306 at time 308 and returns from the default occupied setting 306 to the unoccupied setting 304 at time 310. Similarly, a heating schedule 312 transitions from a default unoccupied setting 314 to a default occupied setting 316 at time 308 and returns from the default occupied setting 316 to the default unoccupied setting 314 at time 310. Without knowledge of specific users at a shared location associated with the cooling schedule 302 and the heating schedule 312, times 308 and 310 may be set to a full business day, giving a wider temperature range between the default unoccupied settings 304, 314 and a narrower temperature range between the default occupied settings 306, 316. However, if the shared location associated with the cooling schedule 302 and the heating schedule 312 is unoccupied or only occasionally occupied between times 308 and 310, the cooling schedule 302 and the heating schedule 312 may be deemed as energy inefficient due to heating and/or cooling applied regardless of occupancy.

Figure 4:
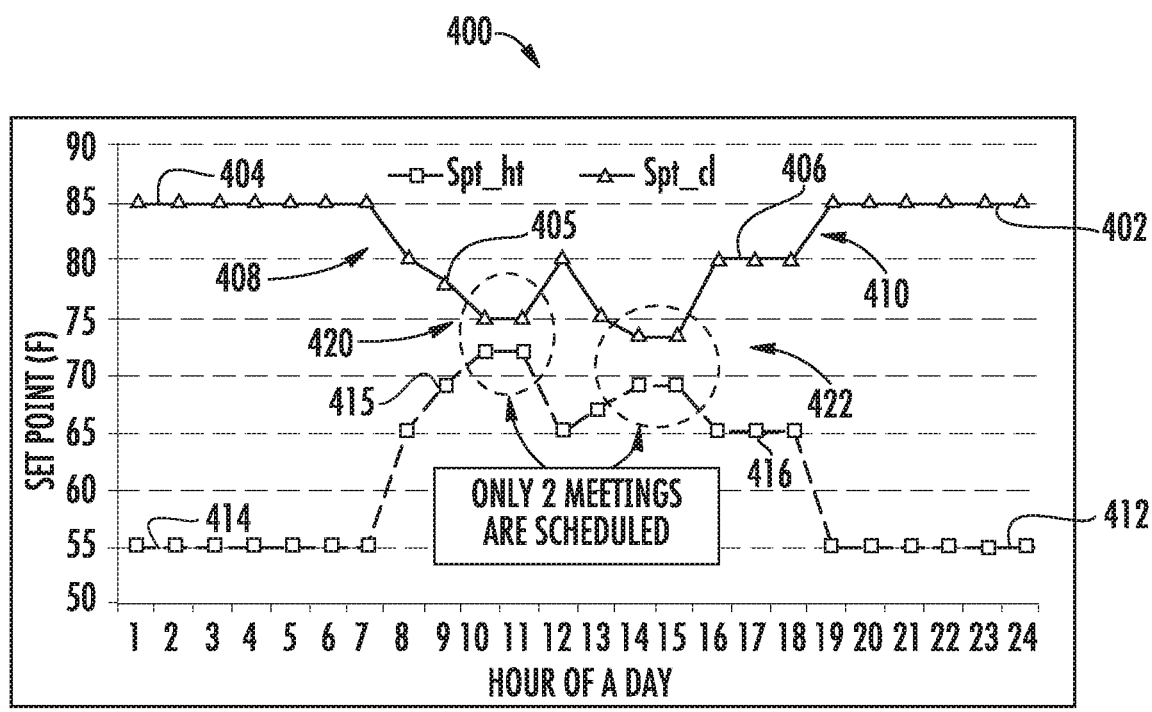
FIG. 4 depicts an example of an adjusted set point schedule for indoor environmental planning, according to an embodiment of the present disclosure.

FIG. 4 depicts an example of an adjusted set point schedule 400 for indoor environmental planning, where set point adjustments can be made by the indoor environment planning system 110 of FIG. 1. In contrast to the default set point schedule 300 of FIG. 3, the adjusted set point schedule 400 is established based on preferences of expected occupants at a shared location, duration of expected occupancy, and other factors as previously described. The adjusted set point schedule 400 is depicted for temperature settings in the example of FIG. 4; however, it will be understood that multiple environmental settings at a shared location can have similar but separate schedules. In FIG. 4, a cooling schedule 402 transitions from a default unoccupied setting 404 to a default occupied setting 406 at time 408 and returns from the default occupied setting 406 to the default unoccupied setting 404 at time 410. Similarly, a heating schedule 412 transitions from a default unoccupied setting 414 to a default occupied setting 416 at time 408 and returns from the default occupied setting 416 to the default unoccupied setting 414 at time 410. However, rather than remain at the default occupied settings 406, 416, indoor environmental preferences of users scheduled to attend a first scheduled meeting 420 and a second scheduled meeting 422 are used to establish adjusted set points that differ from the default occupied settings 406, 416. Thus, as can be seen in FIG. 4, the cooling schedule 402 dips below the default occupied setting 406 for the first scheduled meeting 420, transitions to the default occupied setting 406 after the first scheduled meeting 420, again transitions below the default occupied setting 406 for the second scheduled meeting 422, and then transitions to the default occupied setting 406, where a weighted set point from the second scheduled meeting 422 is less than a weighted set point of the first scheduled meeting 420. Similarly, the heating schedule 412 rises above the default occupied setting 416 for the first scheduled meeting 420, transitions to the default occupied setting 416 after the first scheduled meeting 420, again transitions above the default occupied setting 416 for the second scheduled meeting 422, and then transitions to the default occupied setting 416. Notably, since cooling schedule 402 and heating schedule 412 are predictively adjusted, not only are energy savings achieved during scheduled meetings 420, 422 but also during non-meeting time periods as the default occupied settings 406, 416 can be set to a wider temperature band as compared to the default occupied settings 306, 316 of FIG. 3. The default occupied setting 406 can be set to a level that is less than the default unoccupied setting 404 but greater than settings expected for the scheduled meetings 420, 422 to reduce the transition time needed for scheduled meetings 420, 422 and to more readily handle unanticipated occupancy conditions at the shared location and/or short lead time scheduling. Similarly, the default occupied setting 416 can be set to a level that is greater than the default unoccupied setting 414 but less than settings expected for the scheduled meetings 420, 422. One or more intermediate set points 405, 415 can be inserted to handle transition regions between a current set point and a targeted set point (e.g., between default occupied setting 406, 416 and set points for scheduled meetings 420, 422).

Figure 5:
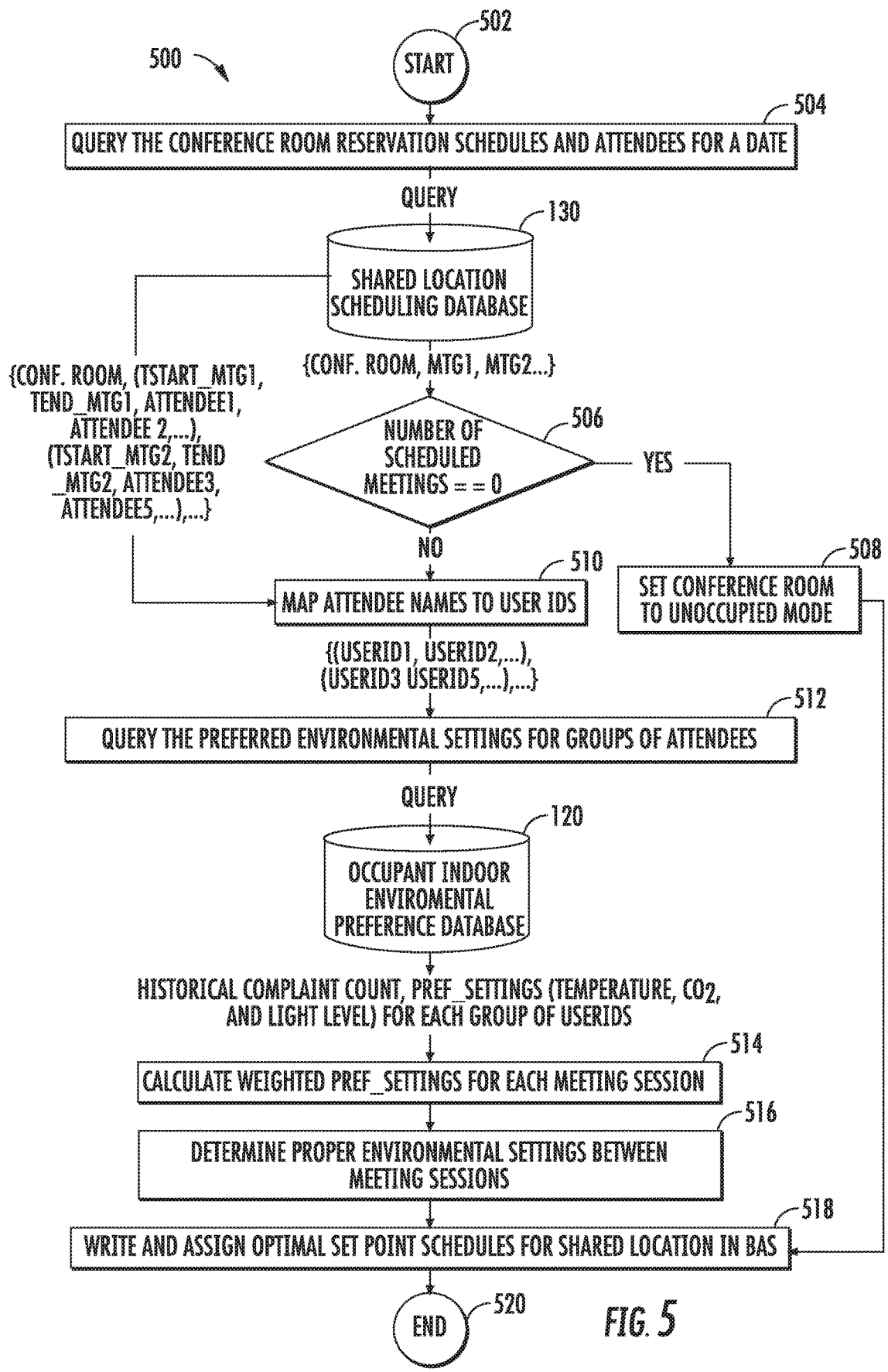
FIG. 5 depicts a process for indoor environmental planning, according to an embodiment of the present disclosure.

FIG. 5 shows a flow chart of a method 500 of indoor environmental planning for controlling temperature at a shared location in the building 102 of FIG. 1, in accordance with an embodiment of the disclosure. The method 500 is described in reference to FIGS. 1-5 and can include additional steps beyond those depicted in FIG. 5. The method 500 can be performed by the indoor environment planning system 110 of FIG. 1.

At block 502, the method 500 starts, and at block 504, the shared location scheduling database 130 is queried for room reservation schedules and attendees for a given date. The results of the query can include a list of scheduled meetings 420, 422, attendees, and optionally a confirmation status of the attendees indicating whether the attendees have confirmed an attendance request or have an alternate status, such as tentative attendance. At block 506, if there are no scheduled meetings 420, 422 for the given date, then at block 508, the set point schedule for the shared location can be set to a default unoccupied setting 404, 414. Otherwise, at block 510, attendee names can be mapped to user identifiers. At block 512, the occupant indoor environmental setting preference database 120 is queried to get the occupant indoor environmental setting preferences 206 for the group of attendees. At block 514, weighted set points for each scheduled meeting 420, 422 are determined as previously described. At block 516, optimization can be performed to determine the proper environmental settings during transitions between scheduled meetings 420, 422 to produce an adjusted set point schedule 210, 400. At block 518, the adjusted set point schedule 210, 400 is provided to the building automation system 104 to make control adjustments based on the adjusted set point schedule 210, 400. At block 520, the method 500 ends.

Figure 6:
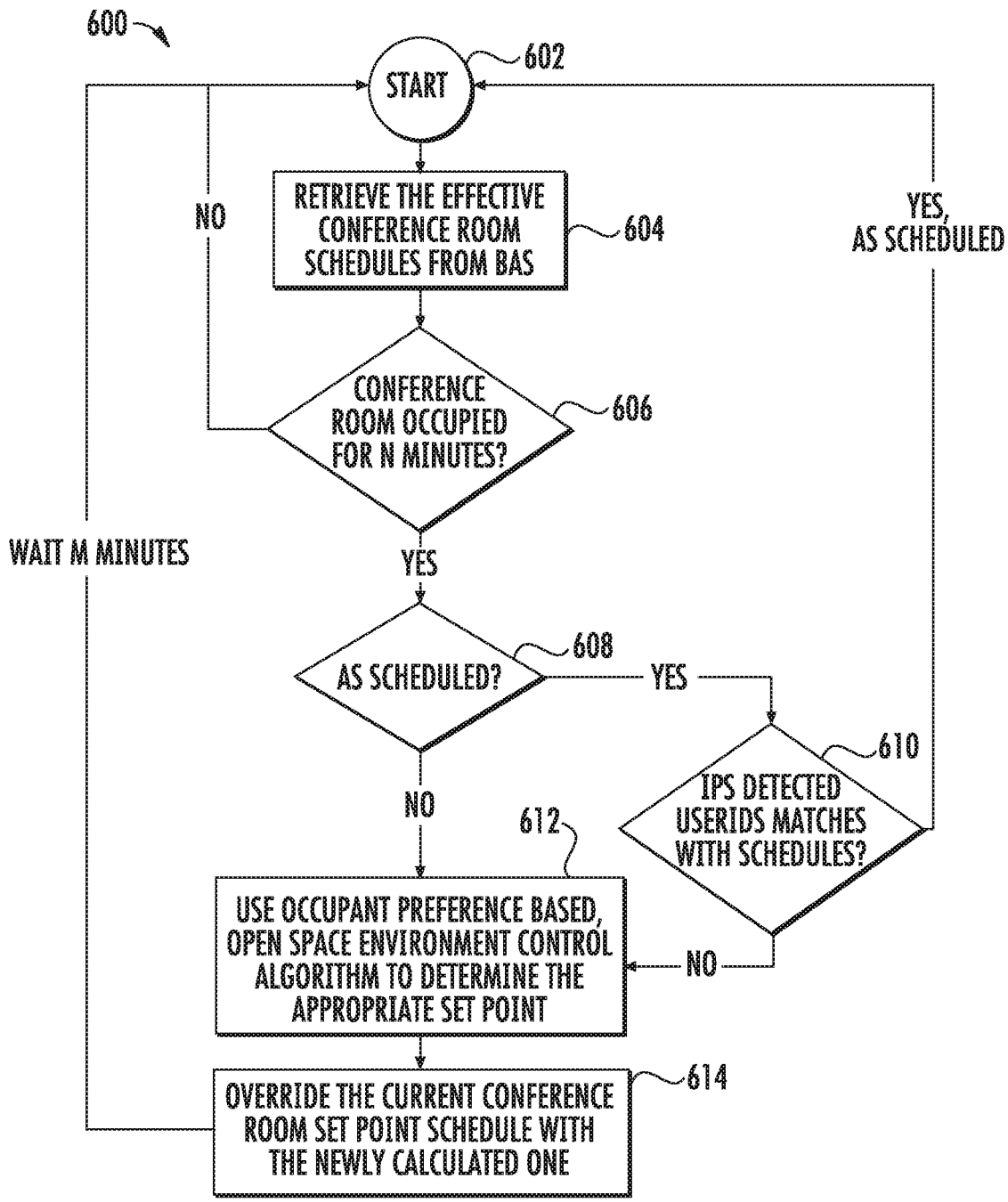
FIG. 6 depicts a process for indoor environmental schedule modification, according to an embodiment of the present disclosure.

FIG. 6 shows a flow chart of a method 600 of indoor environmental schedule modification in accordance with an embodiment of the disclosure. The method 600 is described in reference to FIGS. 1-6 and can include additional steps beyond those depicted in FIG. 6. The method 600 can be applied to any number of building systems 107, such as lights, air temperature, air quality (CO2 level), humidity, noise level, blinds, and the like. The method 600 can be performed by the indoor environment planning system 110.

At block 602, the method 600 starts, and at block 604, a current set point schedule can be retrieved, for instance, from the building automation system 104. At block 606, it is determined whether the shared location, such as a conference room, has been occupied for a predetermined number of minutes (e.g., N minutes). Occupancy can be determined using a combination of motion sensors and/or position information from the positioning system 112 and/or badge based access control system, and mapping system 114. If the shared location is occupied, at block 608, the indoor environment planning system 110 can confirm whether the occupants match the occupancy schedule 202 in combination with the positioning system 112 and mapping system 114 at block 610. If the occupants are all as expected, then the method 600 can return to block 602. Otherwise, at block 612, occupant indoor environmental setting preferences 206 of the current occupants can be determined and an updated weighted set point determined for the shared location. At block 614, the adjusted set point schedule 210, 400 is modified to account for the updated weighted set point and provided to the building automation system 104. After a predetermined delay (e.g., M minutes), the method 600 restarts at block 602 to perform a periodic re-evaluation.

Figure 7:
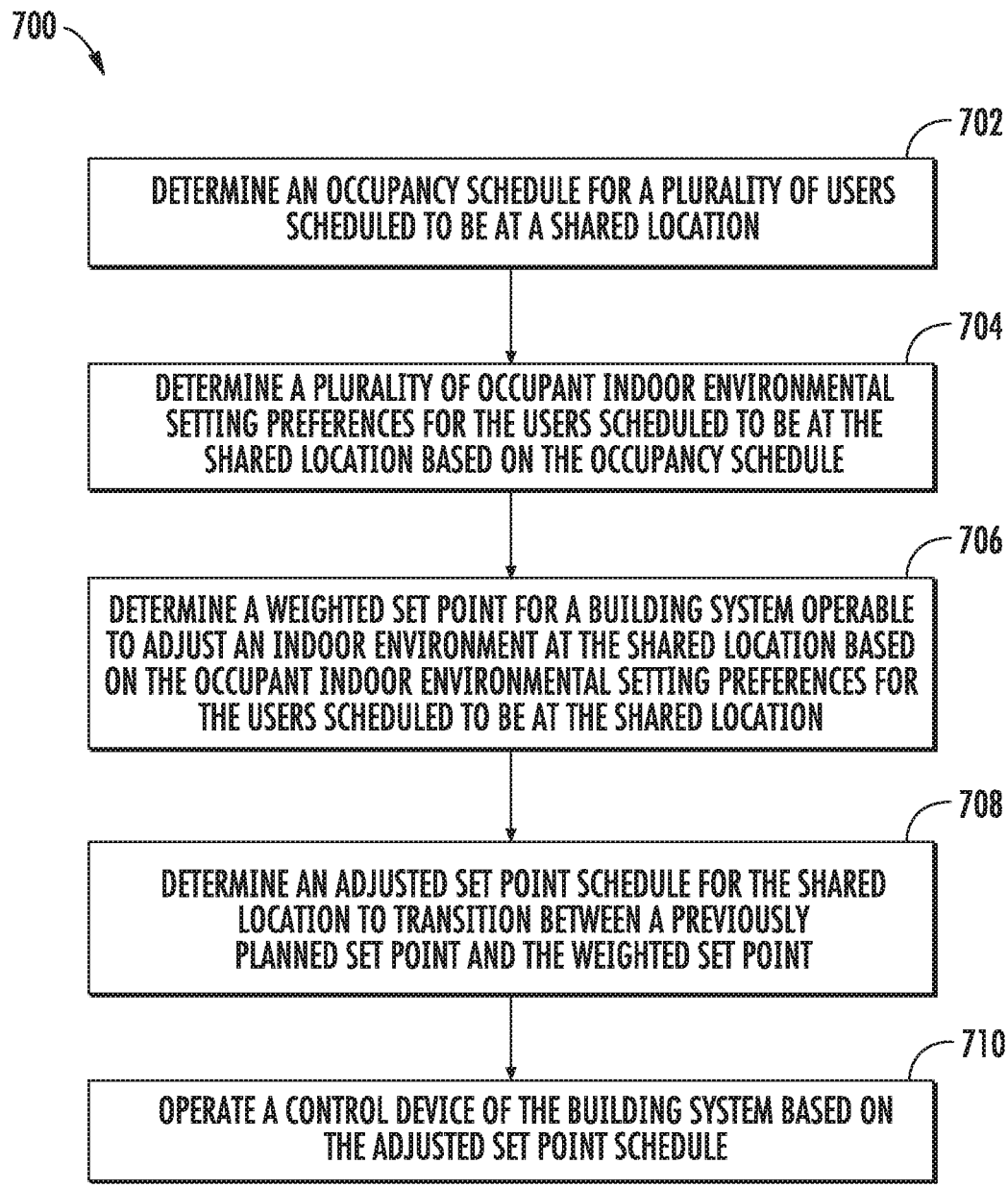
FIG. 7 depicts a process for indoor environmental planning, according to an embodiment of the present disclosure.

FIG. 7 shows a flow chart of a method 700 of indoor environmental planning for predictively controlling a plurality of building systems 107 of FIG. 1, in accordance with an embodiment of the disclosure. The method 700 is described in reference to FIGS. 1-7 and can include additional steps beyond those depicted in FIG. 7. The method 700 can be applied to any number of building systems 107, such as lights, air temperature, air quality (CO2 level), humidity, noise level, blinds, and the like.

At block 702, a processor 170 of indoor environment planning system 110 determines an occupancy schedule 202 for a plurality of users scheduled to be at a shared location. At block 704, the processor 170 of indoor environment planning system 110 determines a plurality of occupant indoor environmental setting preferences 206 for the users scheduled to be at the shared location based on the occupancy schedule 202. The occupant indoor environmental setting preference database 120 can include records of occupant indoor environmental setting preferences 206 for a plurality of users at a plurality of locations. Occupant indoor environmental setting preferences 206 can be recorded in occupant indoor environmental setting preference database 120 with respect to time of day and/or time of year based on user feedback. User feedback can be collected from various types of input, including one or more complaints associated with indoor environmental conditions at the location. Along with user position information, the indoor environment planning system 110 can also track staying time of each of the users at locations.

At block 706, the processor 170 of indoor environment planning system 110 determines a weighted set point for a building system 107 operable to adjust an indoor environment at the shared location based on the occupant indoor environmental setting preferences 206 for the users scheduled to be at the shared location. The weighted set point can be determined based on a complaint history of the users, where the weighted set point applies a greater weight for the users having a larger number of complaints. The weighted set point can also be determined based on one or more energy efficiency constraints to balance the occupant indoor environmental setting preferences 206 of the users with anticipated energy usage.

At block 708, the processor 170 of indoor environment planning system 110 determines an adjusted set point schedule 210, 400 for the shared location to transition between a previously planned set point and the weighted set point. The indoor environment planning system 110 can identify a plurality of scheduled meetings 420, 422 at the shared location and set the adjusted set point schedule 210, 400 based on differences in the weighted set point for each of the scheduled meetings 420, 422. One or more intermediate set points 405, 415 can be inserted in a transition region between the scheduled meetings 420, 422 in the adjusted set point schedule 210, 400. The adjusted set point schedule 210, 400 can transition to a default occupied setting between the scheduled meetings 420, 422. The adjusted set point schedule 210, 400 can also transition to a default unoccupied setting before the scheduled meetings 420, 422 and after the scheduled meetings 420, 422, where the default unoccupied setting is different than the default occupied setting.

At block 710, a control device 106 of the building system 107 is operated based on the adjusted set point schedule 210 to transition between the previously planned set point and the weighted set point. The occupancy at the shared location can be monitored, and the adjusted set point schedule 210, 400 can be modified based on detecting a difference between the occupancy schedule 202 and the occupancy at the shared location. Occupancy monitoring can include mapping a plurality of names of the users to a plurality of user devices 108 and one or more locations of the user devices 108 can be observed relative to the shared location. The indoor environment planning system 110 can use data from the positioning system 112, and/or mapping system 114 to determine the location of the user devices 108. Periodically the occupancy schedule 202 and the occupant indoor environmental setting preferences 206 of the users can be re-evaluated to update the adjusted set point schedule 210, 400.

While described with respect to a single weighted set point, it will be understood that the method 700 can determine a plurality of weighted set points to adjust a plurality of control devices 106 for a plurality of building systems 107 operable to adjust the indoor environment at the location with the weighted set points provided to the building automation system 104.

While the above description has described the flow process of FIG. 7 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of integrated environmental control for shared locations, the method comprising:
   determining, by a processor of an indoor environment planning system, an occupancy schedule for a plurality of users scheduled to be at a shared location;
   identifying a plurality of scheduled meetings at the shared location;
   determining, by the processor of the indoor environment planning system, a plurality of occupant indoor environmental setting preferences for the users scheduled to be at the shared location based on the occupancy schedule;
   determining, by the processor of the indoor environment planning system, a weighted set point for a building system operable to adjust an indoor environment at the shared location based on the occupant indoor environmental setting preferences for the users scheduled to be at the shared location;
   determining, by the processor of the indoor environment planning system, an adjusted set point schedule for the shared location to transition between a previously planned set point and the weighted set point, wherein the adjusted set point schedule is set based on differences in the weighted set point for each of the scheduled meetings, and one or more intermediate set points are inserted in a transition region between the scheduled meetings in the adjusted set point schedule;
   outputting the adjusted set point schedule to a building automation system; and
   operating, by the building automation system, a control device of the building system based on the adjusted set point schedule.

2. The method of claim 1, wherein the weighted set point is determined based on a complaint history of the users and applies a greater weight for the users having a larger number of complaints.

3. The method of claim 1, wherein the weighted set point is determined based on one or more energy efficiency constraints to balance the occupant indoor environmental setting preferences of the users with anticipated energy usage.

4. The method of claim 1, further comprising:
   transitioning the adjusted set point schedule to a default occupied setting between the scheduled meetings.

5. The method of claim 4, further comprising:
   transitioning the adjusted set point schedule to a default unoccupied setting before the scheduled meetings and after the scheduled meetings, wherein the default unoccupied setting is different than the default occupied setting.

6. The method of claim 1, further comprising:
   monitoring occupancy at the shared location; and
   modifying the adjusted set point schedule based on detecting a difference between the occupancy schedule and the occupancy at the shared location.

7. The method of claim 1, further comprising:
   mapping a plurality of names of the users to a plurality of user devices; and
   monitoring one or more locations of the user devices relative to the shared location.

8. The method of claim 1, further comprising:
   periodically re-evaluating the occupancy schedule and the occupant indoor environmental setting preferences of the users to update the adjusted set point schedule.

9. The method of claim 1, wherein the one or more intermediate set points are inserted between a default occupied setting and the scheduled meetings in the adjusted set point schedule.

10. A system for integrated environmental control for shared locations, the system comprising:
    an indoor environment planning system comprising a processor and a memory comprising computer-executable instructions that, when executed by the processor, cause the processor to perform operations, the operations comprising:
    determining an occupancy schedule for a plurality of users scheduled to be at a shared location;
    determining a plurality of occupant indoor environmental setting preferences for the users scheduled to be at the shared location based on the occupancy schedule;
    determining a weighted set point for a building system operable to adjust an indoor environment at the shared location based on the occupant indoor environmental setting preferences for the users scheduled to be at the shared location;
    determining an adjusted set point schedule for the shared location to transition between a previously planned set point and the weighted set point, wherein the adjusted set point schedule is set based on differences in the weighted set point for each of the scheduled meetings, and one or more intermediate set points are inserted in a transition region between the scheduled meetings in the adjusted set point schedule; and outputting the adjusted set point schedule; and a building automation system comprising a second processor and a second memory comprising computer-executable instructions that, when executed by the second processor, cause the second processor to perform operations, the operation comprising:

operating a control device of the building system based on the adjusted set point schedule.

11. The system of claim 10, wherein the weighted set point is determined based on a complaint history of the users and applies a greater weight for the users having a larger number of complaints.

12. The system of claim 10, wherein the weighted set point is determined based on one or more energy efficiency constraints to balance the occupant indoor environmental setting preferences of the users with anticipated energy usage.

13. The system of claim 10, wherein the operations further comprise:

transitioning the adjusted set point schedule to a default occupied setting between the scheduled meetings.

14. The system of claim 13, wherein the operations further comprise:

transitioning the adjusted set point schedule to a default unoccupied setting before the scheduled meetings and after the scheduled meetings, wherein the default unoccupied setting is different than the default occupied setting.

15. The system of claim 10, wherein the operations further comprise:

monitoring occupancy at the shared location; and modifying the adjusted set point schedule based on detecting a difference between the occupancy schedule and the occupancy at the shared location.

16. The system of claim 10, wherein the operations further comprise:

mapping a plurality of names of the users to a plurality of user devices; and monitoring one or more locations of the user devices relative to the shared location.

17. The system of claim 10, wherein the operations further comprise:

periodically re-evaluating the occupancy schedule and the occupant indoor environmental setting preferences of the users to update the adjusted set point schedule.

18. The system of claim 10, wherein the one or more intermediate set points are inserted between a default occupied setting and the scheduled meetings in the adjusted set point schedule.

* * * * *